US006978473B1

(12) United States Patent
Nsonwu et al.

(10) Patent No.: US 6,978,473 B1
(45) Date of Patent: Dec. 20, 2005

(54) POP-UP OPTION PALETTE

(75) Inventors: Alexandra Nsonwu, San Jose, CA (US); Murthy Atmakuri, Sunnyvale, CA (US); Hanchang Kuo, Fremont, CA (US); Kim Mingo, Brooklyn, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 373 days.

(21) Appl. No.: 09/697,964

(22) Filed: Oct. 27, 2000

(51) Int. Cl.[7] .............................................. G06F 3/00
(52) U.S. Cl. ............................ 725/52; 725/39; 725/41; 725/43
(58) Field of Search .............................. 725/39, 40, 43, 725/52, 53, 86, 87, 88, 101, 102, 44, 41

(56) References Cited

U.S. PATENT DOCUMENTS

| | | | |
|---|---|---|---|
| 5,353,121 A | | 10/1994 | Young et al. |
| 5,479,266 A | | 12/1995 | Young et al. |
| 5,479,268 A | | 12/1995 | Young et al. |
| 5,504,519 A | * | 4/1996 | Remillard ..................... 725/10 |
| 5,508,815 A | | 4/1996 | Levine |
| 5,532,754 A | | 7/1996 | Young et al. |
| 5,568,272 A | | 10/1996 | Levine |
| 5,619,249 A | * | 4/1997 | Billock et al. .................. 725/5 |
| 5,796,945 A | | 8/1998 | Tarabella |
| 5,808,694 A | | 9/1998 | Usui et al. |
| 5,818,439 A | * | 10/1998 | Nagasaka et al. ............. 725/87 |
| 5,819,284 A | | 10/1998 | Farber et al. |
| 5,822,123 A | * | 10/1998 | Davis et al. .................. 725/43 |
| 5,903,314 A | | 5/1999 | Niijima et al. |
| 6,002,394 A | * | 12/1999 | Schein et al. ................. 725/39 |
| 6,182,287 B1 | * | 1/2001 | Schneidewend et al. ...... 725/48 |
| 6,348,932 B1 | * | 2/2002 | Nishikawa et al. ......... 345/719 |
| 6,526,577 B1 | * | 2/2003 | Knudson et al. ............. 725/40 |
| 6,704,028 B2 | * | 3/2004 | Wugofski ................... 715/719 |

* cited by examiner

*Primary Examiner*—Ngoc Vu
(74) *Attorney, Agent, or Firm*—Miller Patent Services; Jerry A. Miller

(57) ABSTRACT

A pop-up option palette for controlling electronic equipment such as a set top box. The pop-up option palette of the present invention is implemented as an overlay window enabled by HTML. The pop-up option palette appears anywhere on the system at the touch of a particular key on the remote control and disappears at the touch of the same key in the preferred embodiment. The pop-up option palette provides shortcut methods for jumping to other areas of the system, eliminating the need for actual toolbars or menus. When the pop-up key is activated, a window providing a palette of options appears overlaying the browser's main window. The content of the window can be determined based on the page being displayed so that appropriate information relevant to the page being displayed appears within the pop-up option palette window. Thus, the options available on the pop-up option palette are context sensitive. Additionally, help available through the help button is also context sensitive.

1 Claim, 12 Drawing Sheets

POP-UP OPTION PALETTE

FIELD OF THE INVENTION

This invention relates generally to the field of control of electronic equipment. More particularly, this invention relates to a pop-up option palette used to control options in a video display system, preferably including a set-top box.

BACKGROUND OF THE INVENTION

With the proliferation of television set-top boxes used to navigate through a myriad of cable television channels, satellite television channels and the Internet, there has been a similar proliferation of electronic program guides and control metaphors used to facilitate the user's navigation through television channels, web sites and set-top box (STB) or video system functions. When considered in conjunction with a conventional television set (or even a high definition television set), the system designer is faced with a delicate balance between providing too much information and cluttering the screen so as to make information difficult to find, and providing the user with easy access to required functions.

Toolbars and menu bars are often used in computer programs and electronic program guides to simplify the process of browsing through television channels and web sites and controlling the operation of the STB. However, such toolbars and menu bars occupy valuable screen space. This can be particularly troublesome on conventional NTSC or PAL televisions where resolution of the displayed image limits the amount of information that can be displayed on the screen. If such toolbars and menu bars are not provided, the user is often left with the need to memorize key codes, wade through numerous menus, or backtrack in order to browse a previously browsed area, jump to a different area of the system or control the STB or video system.

SUMMARY OF THE INVENTION

It would therefore be advantageous to provide a shortcut method for navigating through the features of a set-top box, electronic program guide and otherwise control operation of the electronics without the need for toolbars, menu bars and memorized key codes.

The present invention relates generally to a pop-up option palette used in conjunction with an STB to control various functions of operation of the STB and associated systems. Objects, advantages and features of the invention will become apparent to those skilled in the art upon consideration of the following detailed description of the invention.

In one embodiment of the present invention, a pop-up option palette is implemented as an overlay window enabled by HTML. The pop-up option palette appears anywhere on the system at the touch of a particular key on the remote control and disappears at the touch of the same key in the preferred embodiment. The pop-up option palette provides shortcut methods for jumping to other areas of the system, eliminating the need for actual toolbars or menus. When the pop-up key is activated, a window providing a palette of options appears overlaying the browser's main window. The content of the window can be determined based on the page being displayed so that appropriate information relevant to the page being displayed appears within the pop-up palette window. Thus, the options available on the pop-up option palette are context sensitive. Additionally, help available through the help button is also context sensitive.

A method consistent with the present invention of providing user options in operation of a video system, includes: displaying an image on a display screen, the image being associated with a current one of a plurality of operational contexts; detecting actuation of a pop-up option palette control; and upon detecting actuation of the pop-up option palette control, overlaying the image on the display screen with a pop-up option palette displaying a plurality of selectable user options, the options having functions associated with the current operational context.

A storage media storing instructions which, when executed on a programmed processor, carry out a process consistent with the invention of: displaying an image on a display screen, the image being associated with a current one of a plurality of operational contexts; detecting actuation of a pop-up option palette control; and upon detecting actuation of the pop-up option palette control, overlaying the image on the display screen with a pop-up option palette displaying a plurality of selectable user options, the options having functions associated with the current operational context.

A set-top box, consistent with the present invention, includes a programmed processor. A memory device stores an operating system, a browser program and a pop-up option palette program to operate on the programmed processor. An image is displayed on a video display, the image being associated with one of a plurality of operational contexts. A mechanism is provided for receiving user commands. The pop-up option palette program operates to carry out the process of: detecting receipt of a pop-up option palette command; and upon detecting receipt of the pop-up option palette command, overlaying the image on the display screen with a pop-up option palette displaying a plurality of selectable user options, the options having functions associated with the current operational context.

Preferably, the process further includes detecting a subsequent receipt of the pop-up option palette command; and upon detecting the subsequent receipt of the pop-up option palette command, removing the overlaying image from the display screen.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
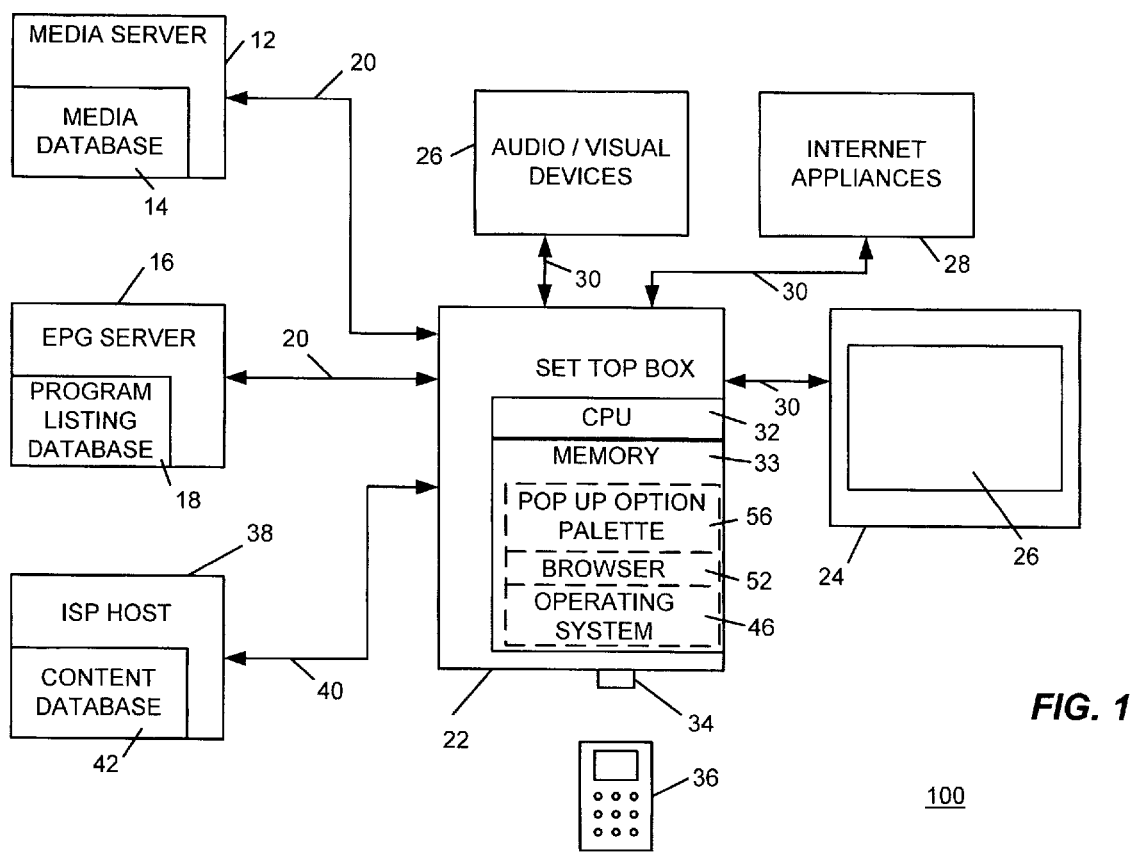
FIG. 1 is a block diagram of a set top box shown in conjunction with a cable system consistent with an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In the following description, numerous details are set forth in order to provide a thorough understanding of the present invention. However, it will be apparent to one of ordinary skill in the art that these specific details are not required in order to practice the present invention. In addition, well known electrical structures and circuits are shown in block diagram form and not described in detail in order so as to not unnecessarily obscure the present invention. Additionally, although the present invention is described in connection with an interactive cable system, it is understood that this invention is applicable to other systems wherein set-top boxes and/or electronic programming guides (EPGs) are used.

Referring to FIG. 1, a block diagram for an exemplary interactive cable television (TV) system 100 is shown. The system 100 includes a media server 12 for providing, on demand, movies and other programming obtained from a media database 14. The media server 12 also provides additional content such as interviews with the actors, games, advertisements, available merchandise, associated Web pages, interactive games and other related content. The system 100 also includes an electronic programming guide (EPG) server 16 and a program listing database 18 for generating an EPG as will be described.

The media 12 and EPG 16 servers are coupled by a transmission medium 20 to a set top box (STB) 22. The transmission medium 20 may include a conventional coaxial cable network, a fiber optic cable network, telephone system, a satellite communication system, a radio frequency (RF) system, a microwave system, other wireless systems, a combination of wired and wireless systems or any of a variety of known electronic transmission mediums.

The system 100 further includes a TV 24, such as a digital television, having a display 26 for displaying an EPG, programming, web content and other display functions. The STB 22 may be coupled to the TV 24 and various other audio/visual devices 26 and Internet Appliances 28 by an appropriate interface 30. In one embodiment, interface 30 conforms to an interface standard such as the Institute of Electrical and Electronics Engineers (IEEE) 1394 standard. The STB 22 may include a central processing unit (CPU) 32 and memory 33 such as Random Access Memory (RAM), Read Only Memory (ROM), flash memory, mass storage such as a hard disc drive, or other electronic storage media, etc. Such memory and storage media is suitable for storing data as well as programmed processes for execution on the CPU 32. STB 22 may include circuitry suitable for audio decoding and processing, the decoding of video data compressed in accordance with a compression standard such as the Motion Pictures Experts Group (MPEG) standard and other processing to form a controller or central hub. Alternatively, components of the STB 22 may be incorporated into the TV 24 itself, thus eliminating the STB 22. Further, a computer having a tuner device may be substituted for the TV 24 and STB 22. Such variations are considered equivalent.

By way of example, the STB 22 may be coupled to devices such as a personal computer, video cassette recorder, camcorder, digital camera, personal digital assistant and other audio/visual or Internet related devices. In addition, a data transport architecture, such as that set forth by an industry group which includes Sony Corporation and known as the Home Audio-Video Interoperability (HAVi) architecture may be utilized to enable interoperability among devices on a network regardless of the manufacturer of the device. This forms a home network system wherein electronic devices and Internet appliances are compatible with each other. Further, the STB 22 runs an operating system 46 suitable for a home network system such as Aperios™ which was developed by Sony Corporation.

The STB 22 includes an infrared (IR) receiver 34 for receiving IR signals from an input device such as remote control 36. Alternatively, it is noted that many other communication methods may be utilized, such as wired or wireless control, radio frequency, etc. In addition, it can be readily appreciated that the input device 36 may be any device suitable for controlling the STB 22 such as a remote control, personal digital assistant, laptop computer, keyboard or computer mouse. In addition, the input device 36 may be a control panel located on the TV 24 or the STB 22. The user manipulates various controls of remote control 36 in order to operate audio visual devices 26, Internet appliances 28 and television 24 remotely. The remote control 36 may include arrow keys, a joystick like pad, a jog shuttle or similar or pointing control in order to navigate through the browser 52 and the pop-up option palette 56.

The STB 22 may also be coupled to an independent service provider (ISP) host 38 by a network 40 such as the Internet. The ISP host 38 provides various content to the user that is obtained from a content database 42. STB 22 may also be used as an Internet access device to obtain information and content form the Internet.

As previously stated, memory 33 of set top box 22 includes an operating system 46 such as the Sony Aperios™ operating system. In addition, browser software 52 resides in memory 33 to facilitate browsing through Web pages on the Internet as well as browsing through television programming and other types of content available through set-top box 22. Video images, such as TV images may be generated as HTML live video in a video window within the browser 52. A pop-up option palette program 56, consistent with the present invention, also resides in memory 33 and is activated upon the user pressing pop-up option palette activation key on remote control 36. This serves to toggle the pop-up option palette on and off.

The pop-up option palette of the present invention is implemented as an overlay window enabled by HTML. The pop-up option palette appears anywhere on the system at the touch of the particular pop-up option palette key on the remote control 36 and disappears at the touch of the same key in the preferred embodiment. The pop-up option palette provides shortcut methods for jumping to other areas of the system, eliminating the need for actual toolbars or menus. When the pop-up key is activated, a window providing a palette of options appears overlaying the browser's main window. The size, content and placement of this menu can be predetermined by the user or by the system designer. The content of the window can be determined based on the page being displayed so that appropriate information relevant to the page being displayed appears within the pop-up option palette window. Thus, the options available on the pop-up option palette are context sensitive. Additionally, help available through the help button is also context sensitive. These and other features of the invention will become clear upon consideration of the following discussion.

Figure 2:
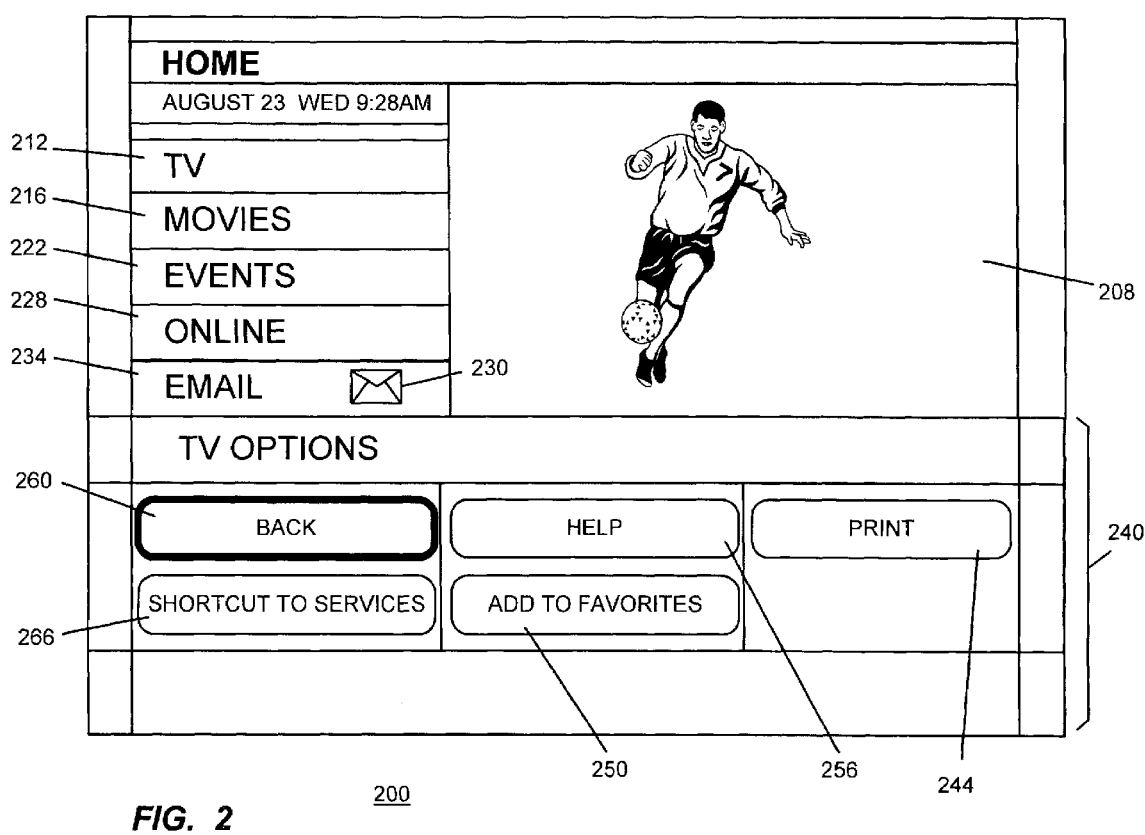
FIG. 2 illustrates a screen image for a home location according to an embodiment of the present invention.

Referring now to FIG. 2 a home screen 200 is illustrated. This screen may represent the default screen that appears on activation of the television equipment. The active programming (e.g. last tuned or default television channel) appears in a window 208 shown near the upper right-hand corner of screen 200. A plurality of locations can be navigated by selecting menu options located in the upper left of the screen. Using these menu selections the user can move to different pages representing different functions of the set-top box. Selecting cell 212 takes the user to the electronic program guide. Selecting cell 216 takes the user to a screen controlling prerecorded movies, for example, to be played on a video cassette recorder or digital videodisc player or to a video on demand system. Selecting cell 222 takes the user to a special events screen such as pay per view. Selecting cell 228 takes the user to online services. Selecting cell 234 takes the user to electronic mail. An icon such as an envelope icon 230 can be used in the E-mail cell 234 to represent the presence of unopened electronic mail.

When the user strikes the predetermined key on remote control 36, the pop-up option palette 240 according to the present invention overlays the active window. In the home screen 200, the pop-up option palette of the present invention knows from the system's operational context of the home screen to overlay the screen with a TV options palette 240. The user can quickly implement various functions suited to the context of the home screen 200 by selecting any of the various tabs of the TV options palette. The current page can be printed by selecting print tab 244. The current location can be added to a list of favorites by selecting the add to favorites tab 250. Context sensitive help can be obtained by selecting the help tab 256. The user can navigate to the previous location by selecting the back tab 260. A shortcut to various services can be obtained by selecting the shortcut to services tab 266.

Figure 3:
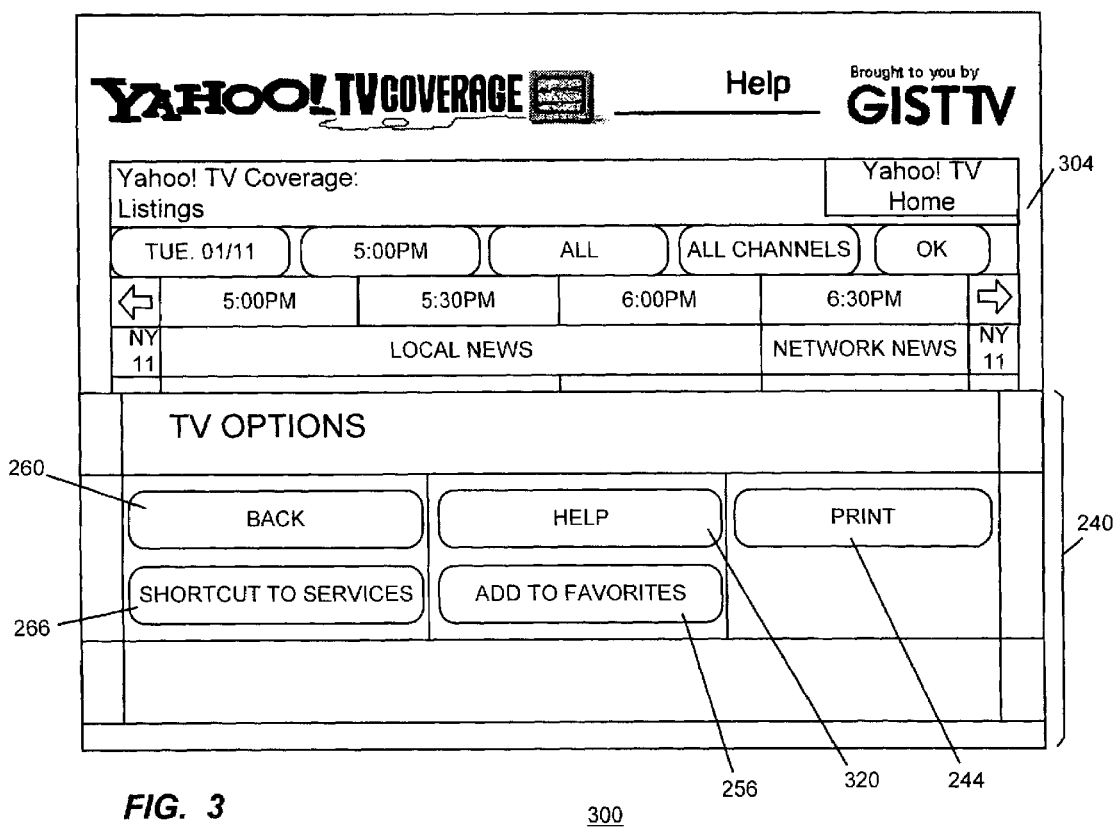
FIG. 3 illustrates a TV options palette screen image overlaying the electronic program guide in an embodiment of the present invention.

Referring now to FIG. 3, a screen 300 representing an electronic program guide 304 also shows the TV options pop-up option palette 240 overlaid thereon. In the embodiment shown, the Yahoo™ TV coverage screen available on the Internet is detected. This should not be considered limiting however since any suitable program guide is appropriate. The function of the print tab 244, the add to favorites tab 256 and the shortcut to services tab 266 are identical to those functions as described in conjunction with FIG. 2. The back tab 260 similarly takes the user to the previous screen. In FIG. 2, the back tab is illustrated as highlighted by the user, whereas in FIG. 3 the back tab 260 is not highlighted. Although the function of option palette 240 is essentially identical to that of option palette 240 of FIG. 2, the selection of TV options in association with program guide 304 determines that the help tab 320 provides help which is context sensitive to the programming guide 304 rather than being context sensitive to the home location as in FIG. 2 if there are any differences in the two help systems.

Figure 4:
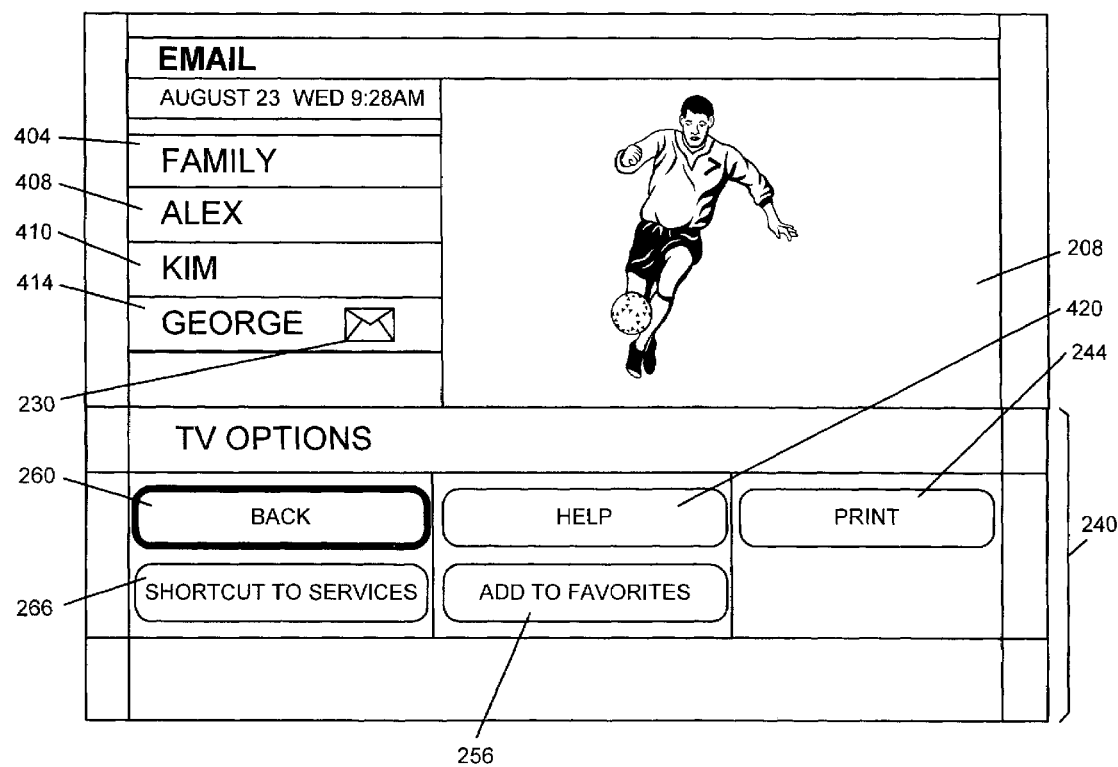
FIG. 4 illustrates an Email options screen image overlaying the Email screen in embodiment of present invention.

Referring now to FIG. 4, the TV options palette 240 is illustrated overlaying an Email screen 400. With reference to operation of the Email screen 400, Email control cell 404 provides access to common family Email. Cell 408, 410 and 414 lead the user to individual Email accounts. Icon 230 indicates that cell 414 contains unopened Email to a user named George. Again, active video is shown in window 208 and the TV options palette control tabs have functions somewhere to those previously described. The help tab 420 however, takes the user to a context sensitive help function suitable for the Email context. The back tab 260, illustrated as selected, takes the user back to the previously selected location.

Figure 5:
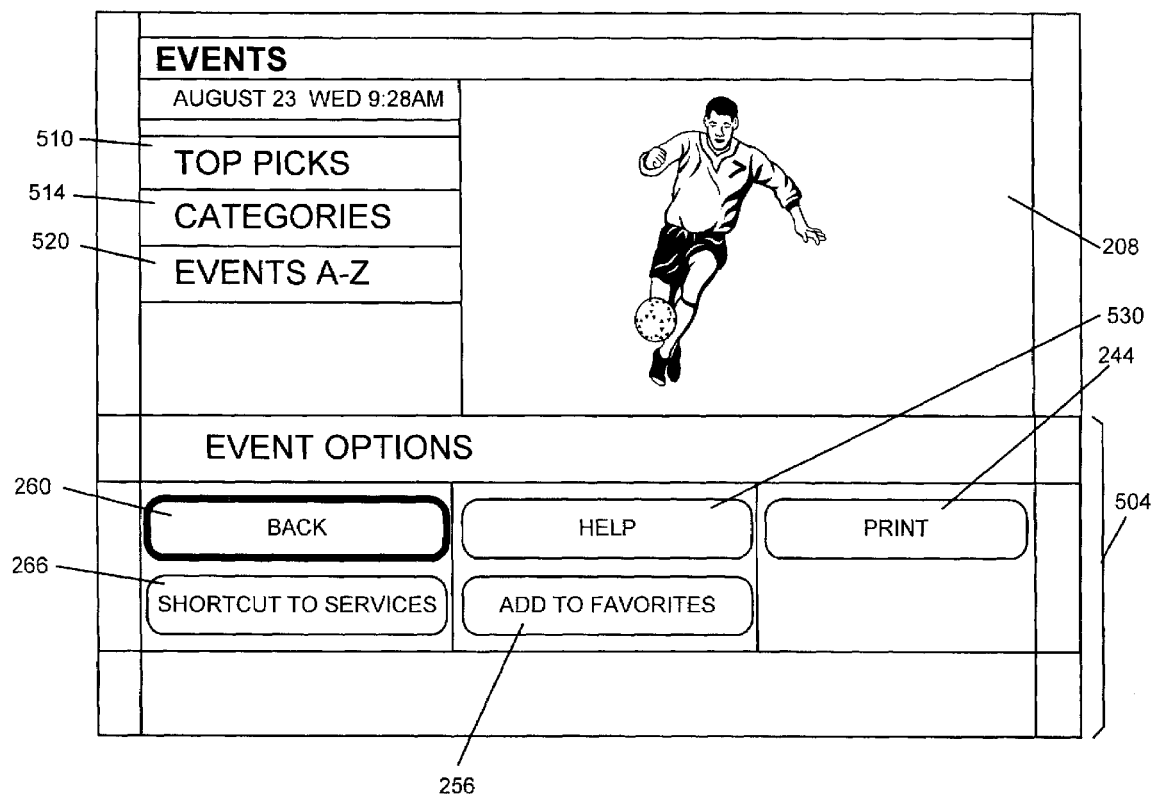
FIG. 5 illustrates an events option palette screen image overlaying an events screen according to an embodiment of the present invention.

Referring now to FIG. 5, an event options palette 504 is overlaying an events screen to produce screen image 500. Again, active video appears in window 208 while control cells for the events screen appear on the left topside of the screen. In this case the user can select top event picks 510 to access top selections, categories 514 for a categorized listing of events or an alphabetical listing of the events A–520. Other suitable controls for an events screen could also be implemented without departing from the present invention. The events option palette 504 includes controls 244 for printing, 256 for adding to favorites, 260 for returning to a previous screen and 266 to access a shortcut to services as in previous option palettes. The help tab 530 provides context sensitive help based upon the events option.

Figure 6:
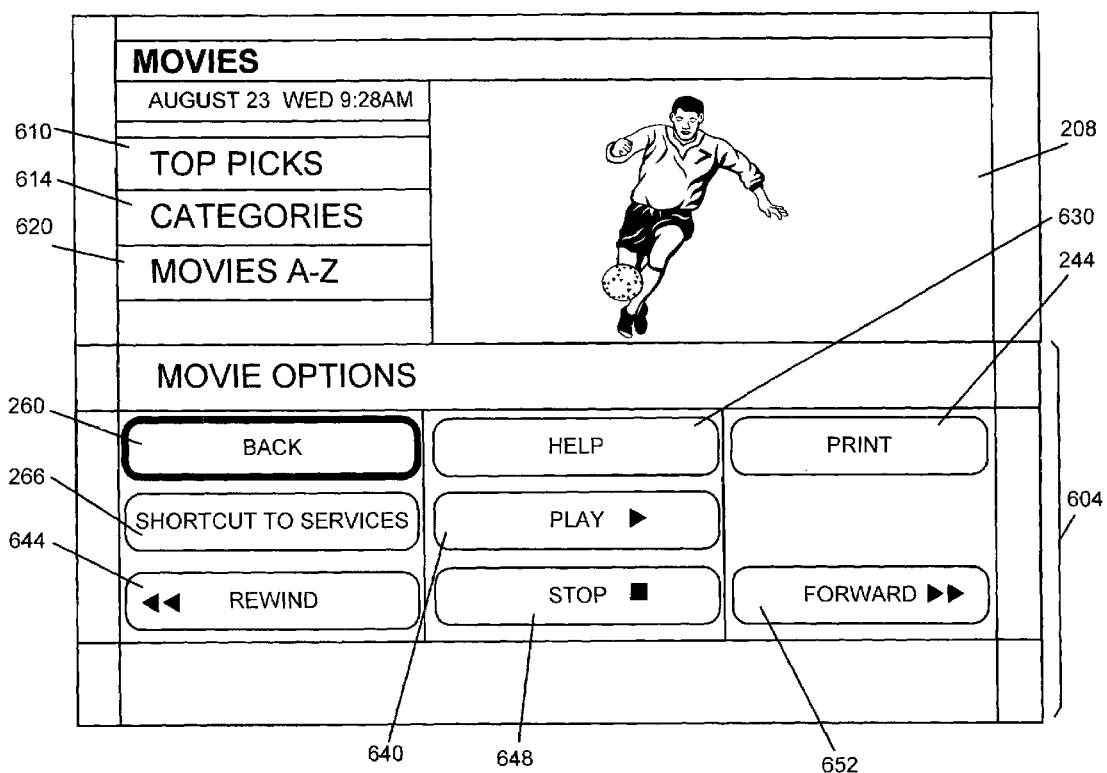
FIG. 6 illustrates a movie options palette screen image overlaying a movie screen according to an embodiment of the present invention.

Referring now to FIG. 6, a movie options palette 604 is overlaying a movie screen to produce screen image 600. Again, active video appears in window 208 while control cells for the movie screen appear on the left topside of the screen. In this case the user can select top movie picks 610 to access top movie selections, categories 614 for a categorized listing of movies or an alphabetical listing of the movies A–620. Other suitable controls for a movie screen could also be implemented without departing from the present invention. The movies option palette 604 includes controls 244 for printing, 256 for adding to favorites, 264 returning to a previous screen and 266 to access a shortcut to services as in previous option palettes. The help tab 630 provides context sensitive help based upon the movies option.

In addition to the control tabs described above, the movies option palette 604 is utilized to control the operation of a video cassette recorder, DVD player or other source of movies. Accordingly, the movie options palette 604 is provided with conventional playback control tabs suitable for use with such devices. These playback control tabs include, in the present embodiment, a play tab 640 to begin playing a selected movie, a rewind tab 644 to rapidly moved backwards in the selection, a stop tab 648 to stop the playback process and a forward tab 652 to move rapidly forward in the selection. Stop tab 648 can also be used to stop the action initiated by rewind tab 644 or forward tab 652. Other movie control features could also be implemented in the movie options palette 604 without departing from the present invention.

Figure 7:
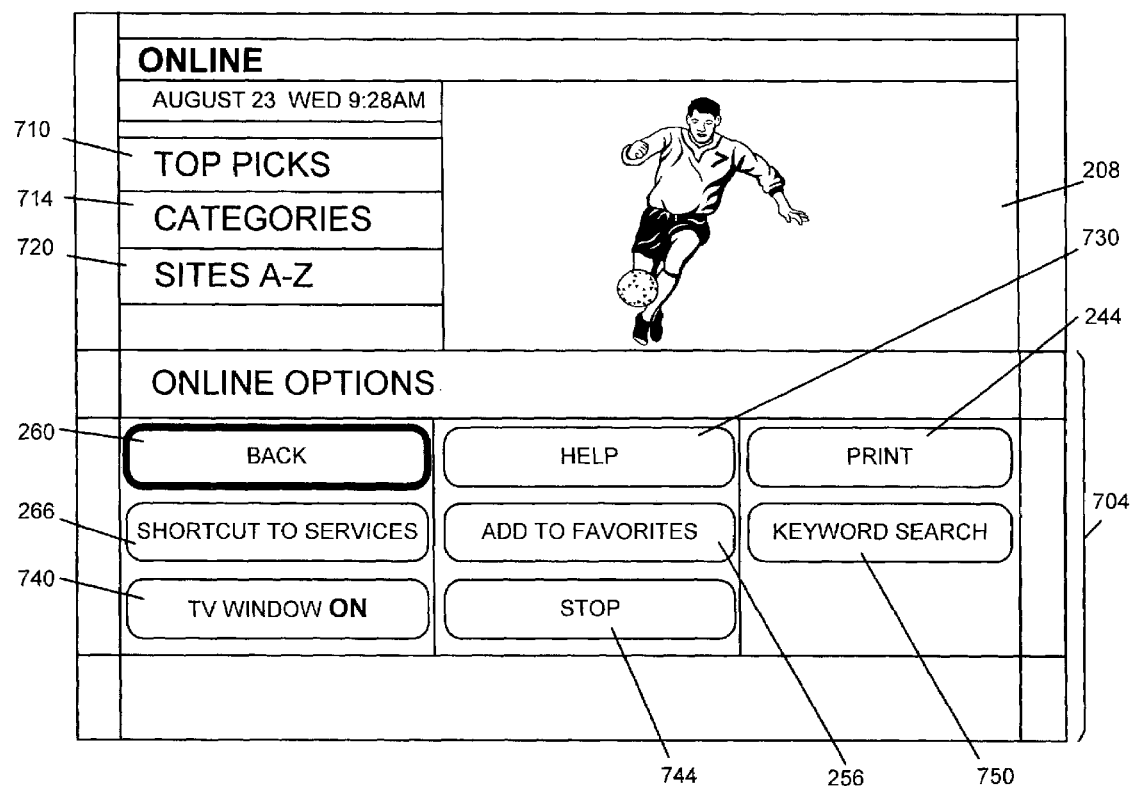
FIG. 7 illustrates an online options screen image overlaying an online browsing screen according to an embodiment of the present invention.

Referring now to FIG. 7, an online options palette 704 is overlaying an online screen to produce screen image 700. Again, active video appears in window 208 while control cells for the online screen appear on the left topside of the screen. In this case the user can select top online picks 710 to access top web sites, categories 714 for a categorized listing of web sites or an alphabetical listing of the web sites A–620. Other suitable controls for an online screen could also be implemented without departing from the present invention. The online option palette 704 includes controls 244 for printing, 256 for adding to favorites, 264 returning to a previous screen and 266 to access a shortcut to services as in previous option palettes. The help tab 730 provides context sensitive help based upon the movies option.

In addition to the control tabs described above, the online option palette 604 is utilized to add control to the web browsing function. Accordingly, the online options palette 704 is provided with a control tab 740 to toggle the TV image on and off in the active display portion 208. A stop tab 744 is provided to halt downloading of a page or other content. A keyword search can be initiated by selection of keyword search tab 750. Of course, other online control features could also be implemented in the online options palette 704 without departing from the present invention.

Figure 8:
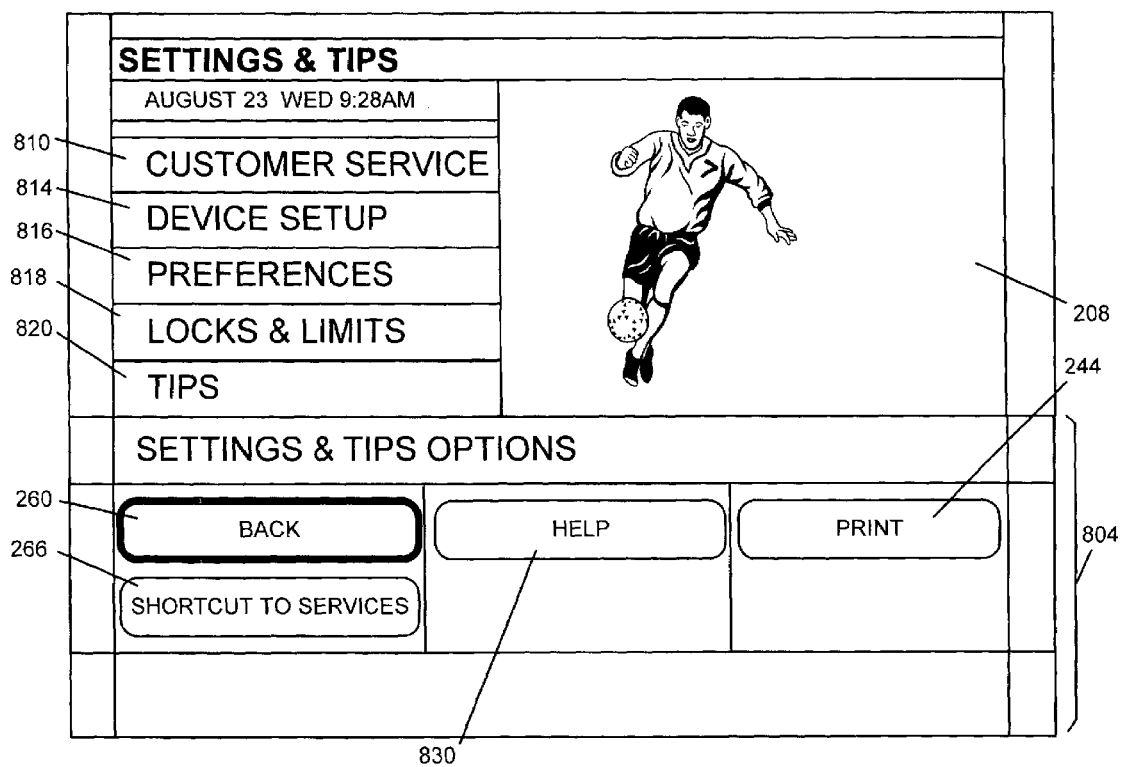
FIG. 8 illustrates a settings and tips options screen image according to an embodiment of the present invention.

Referring now to FIG. 8, a Settings & Tips options palette 804 is overlaying an online screen to produce screen image 800. Again, active video appears in window 208 while control cells for the Settings & Tips screen appear on the left topside of the screen. In this case the user can select customer service cell 810 to access the service provider's customer service department, device setup 814 for controls in setting up the STB 22, user preferences setup or modification at 816, locks and limits settings for parental control and the like at 818 and tips for using the system at 820. Other suitable controls for a Settings & Tips screen could also be implemented without departing from the present invention.

The Settings & Tips palette 804 includes controls 244 for printing, 260 for returning to a previous screen and 266 to access a shortcut to services as in previous option palettes. The help tab 830 provides context sensitive help based upon the Settings & Tips option.

Figure 9:
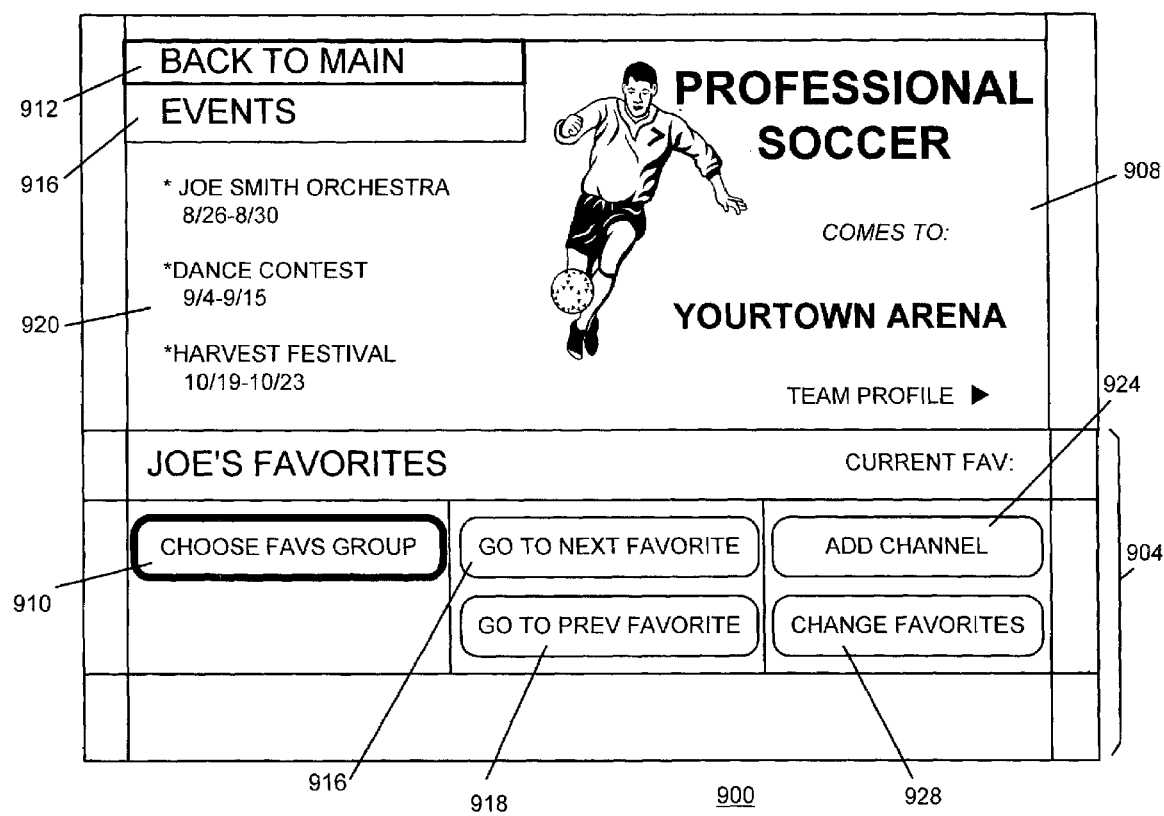
FIG. 9 illustrates a favorites options screen image according to an embodiment of the present invention.

Referring now to FIG. 9, a screen image 900 representing a favorites screen is illustrated. A favorites option palette 904 overlays the favorites screen. In this instance, the favorites screen shows events in a particular area with promotional information appearing in the area 908. The user can select cell 912 in order to move back to the main menu associated with this selected users favorites. The user can select cell 916 to obtain more detailed information and other options related to the current favorites screen being displayed. The area 920 illustrates a listing of selected favorites associated with the current user. The favorites option palette 904 provides tabs associated with control of the users favorites profile. Tab 910, shown highlighted, permits the users to select among various favorites groups. Tab 916 allows the user to scroll to the next favorites while tab 918 allows the user to scroll to the previous favorite. A channel can be added to the current favorites by using tab 924 and the favorites can be changed using tab 928. Other suitable controls for controlling a favorites option palette could also be implemented without departing from the present invention.

Figure 10A:
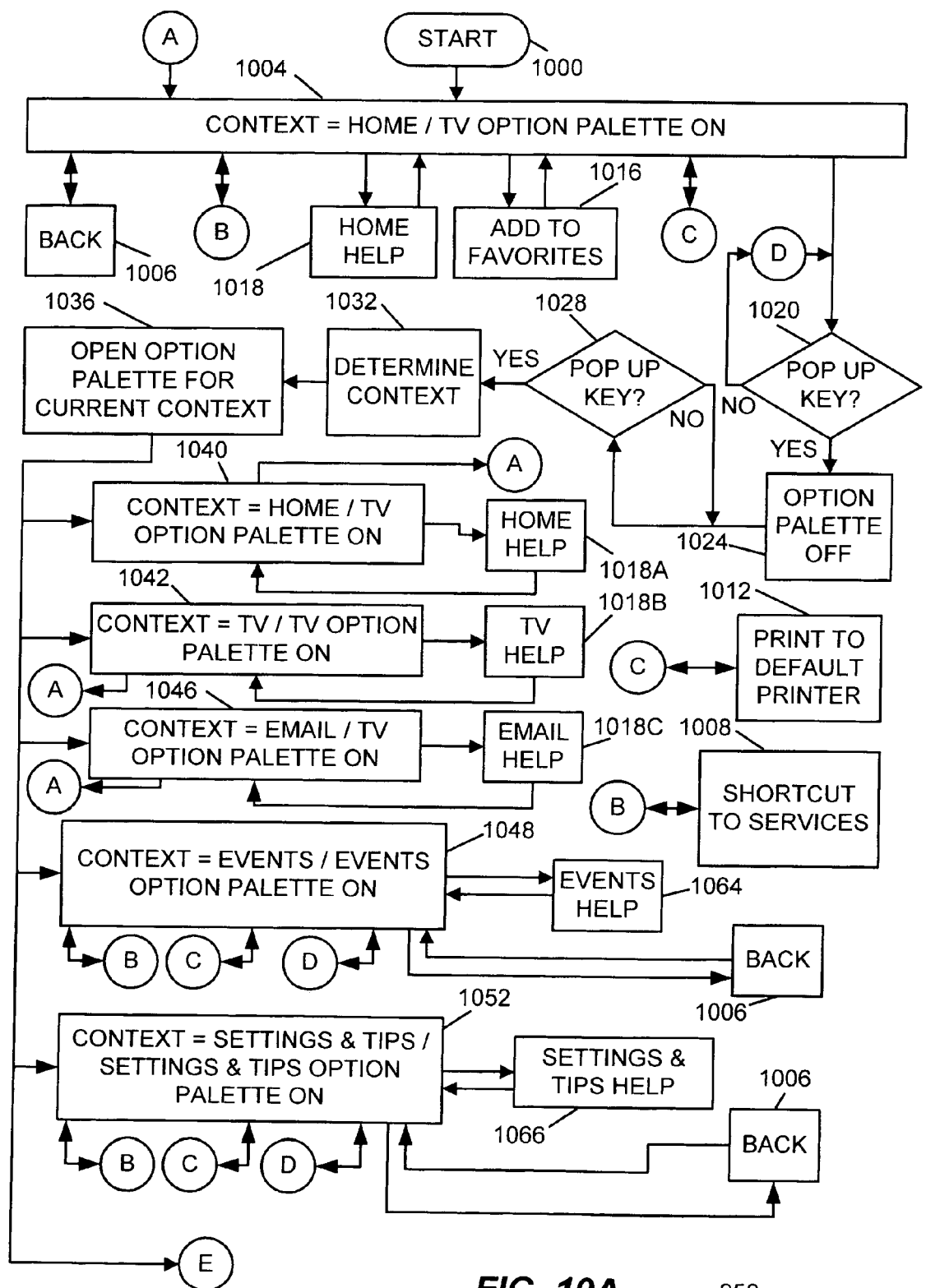
FIG. 10, which is made up of FIGS. 10A, 10B and 10C, is a flow chart describing the operation of the pop-up option palette consistent with embodiments of the present invention.
Figure 10B:
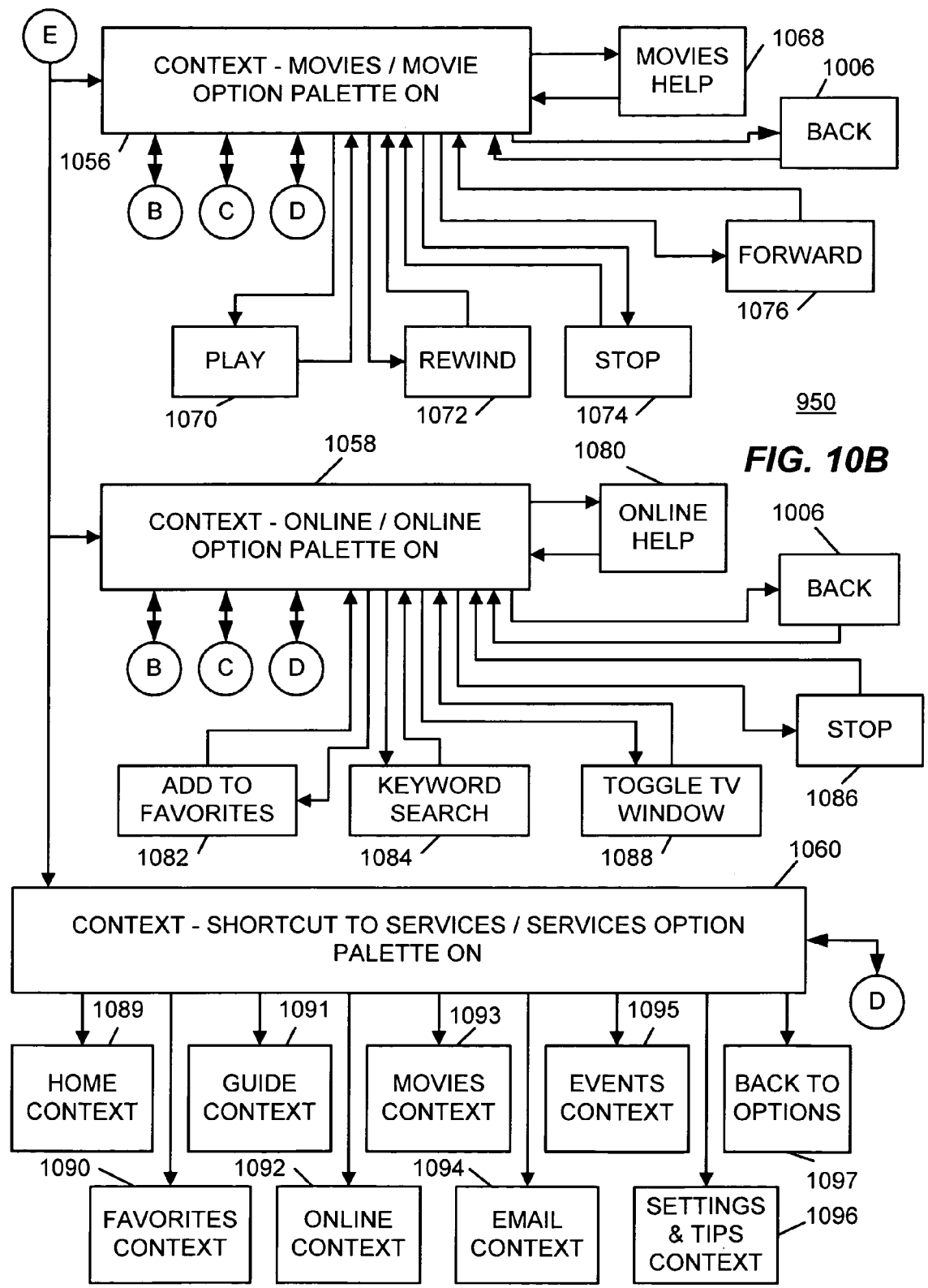
Figure 10C:
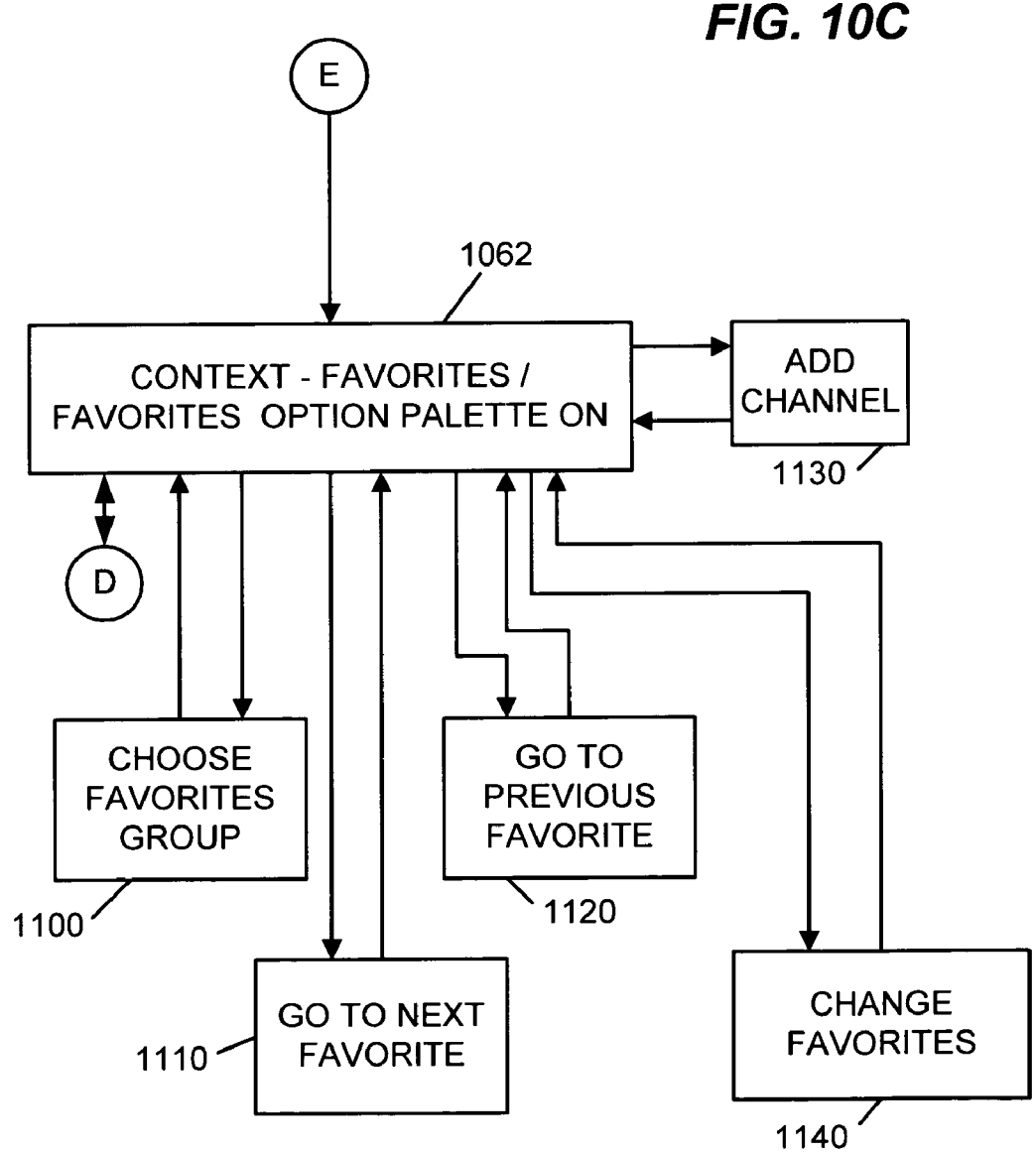

A process 950 for implementing the pop-up option palette consistent with the above description is illustrated in FIG. 10, which is made up of FIG. 10A, FIG. 10B and FIG. 10C. The process begins at 1000 at the system startup. This occurs whenever the user activates the set-top box by pressing a suitable key on remote control 36. Upon startup of the system, the home screen is selected by default. That is, the context is set to home at 1004. In the home context, the TV option palette is turned on if the user activates the pop-up option palette key of remote control 36. When the TV option palette is activated, the user has the option of going back at 1006, taking a shortcut to services at 1008, printing to the default printer at 1012, adding a channel to the favorites list at 1016 or obtaining help at 1018 in a context sensitive help system suitable for the home screen. If the user activates the pop-up key at 1020 the option palette is turned off at 1024. Otherwise, the pop-up option palette remains turned on. Once the pop-up options palette is turned off at 1024, when the pop up key is actuated again at 1028 the system first determines the current context at 1032. In the embodiment shown, the context can be home, TV, E-mail, events, settings & tips, movies, online, favorites and shortcut to services.

At 1036, the system opens the appropriate option palette for the current operational context. If the context is home at 1040, the system opens a the TV option palette. If the context is TV or program guide at 1042 the system opens a slightly modified TV option palette. If the context is Email, the system opens a slightly modified TV option palette at 1046. If the context is events, the system opens the events option palette at 1048. If the context is settings & tips at 1052 the system opens the settings and tips option palette. If the context is movies at 1056, the system opens the movies option palette. If the context is online at 1058, the system opens the online option palette. If the context is shortcut to services, the system opens the services option palette at 1060. If the context is favorites at 1062, the system opens the favorites option palette at 1062.

In the case of the home context at 1040, all of the options available in the home context 1004 are available. In the case of the context of TV context or program guide context at 1042, all of the home option palette selections are similarly available except to that the help selection 1018A is substituted for the home help and is TV context sensitive. In the case of the Email context at 1046, all of the home option palette selections are similarly available except that the Email help 1018B is substituted and is Email context sensitive.

In the case of the events context at 1048, shortcut to services 1008 is available, printing to the default printer at 1012 is available, as well as the back function 1006. The help option 1064 is context sensitive to events.

In the case of the settings & tips context at 1052, the shortcut to services at 1008, the printing to the default printer at 1012 and back function at 1006 are all available. Help is available at 1066 context specific to the settings & tips context.

In the case of the movies context at 1056, the shortcut to services option is available at 1008. Printing to the default printer is available at 1012. The back function is available at 1006 and the help function is available at 1068 in the movies context. In addition to these functions, play function 1070, rewind function 1072, stop function 1074 and forward function 1076 are available.

In the case of the online context at 1058, the shortcut to services at 1008 and access to the default printer at 1012 are available. Help is available at 1080 in the context of online. In addition, the back function at 1006 is available. Online related functions of adding to favorites at 1082, keyword searching at 1084 and stopping a download at 1086 are available. The TV window can be toggled at 1088.

In the context of shortcut to services at 1060, the user can navigate to the home context at 1089, to the favorites context at 1090, to the guide context at 1091, to the online context at 1092, to the movies context at 1093, to the Email context at 1094, to the events context at 1095, to the settings and tips context at 1096 or may return back to the previous options context at 1097.

In the context of favorites at 1062, the user can choose a favorites group at 1100, go to a next favorite at 1110 or to a previous favorite at 1120. The user can add a channel to the favorites at 1130 or change favorites at 1140.

In each of the above context's, whenever the option palette is on, the system continuously monitors for receipt of an indication of actuation of the pop up key at 1020. In the event the pop-up key is actuated, the option palette is closed. Another actuation of the pop-up key at 1028 reopens the appropriate option palette as determined by the context at 1032. Whenever a selection is made from any of the context's on any of the option palette's, upon completing a task associated with the selection, control returns to the option palette which is active.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A set-top box, comprising:
a programmed processor;
a memory device storing an operating system, a browser program and a pop-up option palette program to operate on the programmed processor;
means for displaying an image on a video display, the image being associated with one of a plurality of operational contexts;
means for receiving user commands;
and wherein the pop-up option palette program operates to carry out the process of:
  detecting receipt of a pop-up option palette command;
  upon detecting receipt of the pop-up option palette command, overlaying the image on the display screen with a pop-up option palette displaying a plurality of user selectable options, the plurality of user selectable options having functions associated with a current operational context that is selected by user;
wherein the current operational context is selected from the plurality of operational contexts consisting of at least a home context, a TV context, an Email context, an events context, a settings & tips context, a movies context, an online context, a shortcut to services context, a program guide context and a favorites context;
wherein each of the plurality of user selectable options has a function of providing help for the current operational context;
wherein if the current operational context comprises one of a home context, a program guide context, a TV context, and an Email context; then the user selectable options provide at least the functions of adding a current channel to a favorites list, printing to a printer, and providing a shortcut to services;
wherein if the current operational context comprises one of a settings & tips context and an events context; then the user selectable options provide at least the functions of providing a shortcut to services and printing to a printer;
wherein if the current operational context comprises a movies context; then the user selectable options provide at least the functions of playing a movie, rewinding a movie, forwarding a movie and stopping the functions of playing, rewinding and forwarding;
wherein if the current operational context comprises an online context; then the user selectable options provide at least the functions of adding a page to a favorites list and initiating a keyword search;
wherein if the current operational context comprises a shortcut to services context; then user selectable options provide at least the function of shifting to another available operational context;
wherein if the current operational context comprises a settings & tips context; then the user selectable options provide at least the functions of showing the user operational tips and permitting the user to change operational settings; and
wherein if the current operational context comprises a favorites context; then the user selectable options provide at least the functions of choosing a group of favorites, moving to a previous favorites group, moving to a next favorites group, changing favorites and adding a channel to a favorites group;
detecting a subsequent receipt of the pop-up option palette command; and
upon detecting the subsequent receipt of the pop-up option palette command, removing the overlaying the image from the display screen.

* * * * *

UNITED STATES PATENT AND TRADEMARK OFFICE
CERTIFICATE OF CORRECTION

PATENT NO. : 6,978,473 B1
DATED : December 20, 2005
INVENTOR(S) : Alexandra Nsonwu et al.

It is certified that error appears in the above-identified patent and that said Letters Patent is hereby corrected as shown below:

Column 6,
Line 33, delete "A-520" and insert -- A-Z 520 --.
Line 48, delete "A-620" and insert -- A-Z 620 --.

Column 7,
Line 11, delete "A-620" and insert -- A-Z 620 --.

Signed and Sealed this

Twenty-first Day of February, 2006

JON W. DUDAS
*Director of the United States Patent and Trademark Office*